United States Patent
Hosier et al.

(10) Patent No.: US 9,446,556 B2
(45) Date of Patent: Sep. 20, 2016

(54) SYSTEM FOR COMPENSATING FOR DROP VOLUME VARIATION DURING THREE-DIMENSIONAL PRINTING OF AN OBJECT

(71) Applicant: Xerox Corporation, Norwalk, CT (US)

(72) Inventors: Paul A. Hosier, Rochester, NY (US);
Roger L. Triplett, Penfield, NY (US);
Stuart A. Schweid, Pittsford, NY (US);
Terri A. Clingerman, North Rose, NY (US)

(73) Assignee: Xerox Corporation, Norwalk, CT (US)

( * ) Notice: Subject to any disclaimer, the term of this patent is extended or adjusted under 35 U.S.C. 154(b) by 188 days.

(21) Appl. No.: 14/298,153

(22) Filed: Jun. 6, 2014

(65) Prior Publication Data

US 2015/0352781 A1 Dec. 10, 2015

(51) Int. Cl.
*B29C 67/00* (2006.01)

(52) U.S. Cl.
CPC .................. *B29C 67/0059* (2013.01)

(58) Field of Classification Search
CPC ....... B41J 29/38; B41J 29/393; B33Y 10/00; B33Y 30/00; B33Y 50/00
USPC .................. 425/375, 141, 150, 171
See application file for complete search history.

(56) References Cited

U.S. PATENT DOCUMENTS

| | | | |
|---|---|---|---|
| 5,490,962 A | 2/1996 | Cima et al. | |
| 7,442,029 B2 * | 10/2008 | Lof | B82Y 10/00 425/117 |
| 7,931,914 B2 | 4/2011 | Pryce Lewis et al. | |
| 7,974,727 B2 * | 7/2011 | Silverbrook | B22F 3/008 425/375 |
| 8,017,055 B2 | 9/2011 | Davidson et al. | |
| 9,205,691 B1 * | 12/2015 | Jones | B41J 29/393 |
| 2008/0055666 A1 * | 3/2008 | Gila | H04N 1/6033 358/448 |

* cited by examiner

*Primary Examiner* — Joseph S. Del Sole
*Assistant Examiner* — Thukhanh T Nguyen
(74) *Attorney, Agent, or Firm* — Maginot Moore & Beck LLP

(57) ABSTRACT

A printer compensates for variations in ejected material drop volumes occurring during production of the layers for the formation of an object in a three-dimensional printer. The printer includes an optical sensor that generates topographical and measurement data of each layer of the object after each layer is printed. Differences in height between columns of material being formed by the ejectors in the printhead are identified with reference to the data produced by the sensor and raster data used to operate the printhead are modified adjust the formation of a next layer in the object.

18 Claims, 6 Drawing Sheets

SYSTEM FOR COMPENSATING FOR DROP VOLUME VARIATION DURING THREE-DIMENSIONAL PRINTING OF AN OBJECT

TECHNICAL FIELD

The device disclosed in this document relates to printers that produce three-dimensional objects and, more particularly, to the accurate production of objects with such printers.

BACKGROUND

Digital three-dimensional manufacturing, also known as digital additive manufacturing, is a process of making a three-dimensional solid object of virtually any shape from a digital model. Three-dimensional printing is an additive process in which one or more printheads eject successive layers of material on a substrate in different shapes. The substrate is supported either on a platform that can be moved three dimensionally by operation of actuators operatively connected to the platform, or the printhead or printheads are operatively connected to one or more actuators for controlled movement of the printhead or printheads to produce the layers that form the object. Three-dimensional printing is distinguishable from traditional object-forming techniques, which mostly rely on the removal of material from a work piece by a subtractive process, such as cutting or drilling.

The production of a three-dimensional object with these printers can require hours or, with some objects, even days. One issue that arises in the production of three-dimensional objects with a three-dimensional printer is consistent functionality of the inkjets in the printheads that eject the ink drops that form the objects. During printing of an object, one or more inkjets can eject material with a drop volume that is slightly different from the drop volume of the inkjets surrounding the inkjet. These volumetric differences can accumulate during the printing of the multiple layers that form an object so the column of material formed by the inkjet ejecting the smaller or larger drops can be shorter or taller, respectively, than the surrounding material columns formed by the other inkjets. These surface variations can be significant enough to require the scrapping of the object. Because the print jobs can require many hours or multiple days to produce objects, this scrapping of objects can be expensive and time consuming. A printer capable of compensating for the volumetric variations in material drops during printing of an object would be advantageous.

SUMMARY

A printer that detects volumetric drop variations in the inkjets during printing and compensates for these variations during the printing operation includes a platen, a printhead configured with ejectors to eject material onto the platen, an optical sensor configured to generate data corresponding to a topography and measurement of the material on the platen, and a controller operatively connected to the optical sensor and the printhead, the controller being configured to generate raster image data for layers to be printed that form an object on the platen, to operate the printhead to eject material onto the platen with reference to the raster image data for the layers, and to modify raster image data for at least one ejector with reference to topographical and measurement data received from the optical sensor to compensate for variations in drop volumes between the at least one ejector and other ejectors in the printhead ejecting material.

Another embodiment of a printer detects volumetric drop variations in the inkjets during printing and compensates for these variations during the printing operation. This embodiment includes a platen, a printhead configured with ejectors to eject material onto the platen, an optical sensor configured to generate data corresponding to a topography and measurement of the material on the platen, and a controller operatively connected to the optical sensor and the printhead, the controller being configured to operate the ejectors in the printhead to eject material drops onto the platen, to identify differences between volumes of material drops ejecting by the ejectors with reference to topographical and measurement data received from the optical sensor, and to move the printhead to form each column of material on the platen with material ejected from more than one ejector in the printhead to compensate for the identified differences in drop volumes.

A non-transitory computer readable storage media is described below that enables a computer to perform a method that compensates for drop volume variations during printing of a three-dimensional object. Programmed instructions for operating a printer are stored on the non-transitory computer readable storage media. The programmed instructions are configured to enable a controller or other processor executing the programmed instructions to: (1) generate raster image data for layers to be printed that form an object on a platen, (2) operate a printhead with reference to the generated raster image data to eject material onto the platen to the object, and (3) compensate for variations in drop volumes between the at least one ejector and other ejectors in the printhead ejecting material to form the object by modifying the generated raster image data for at least one ejector in the printhead with reference to data received from an optical sensor.

BRIEF DESCRIPTION OF THE DRAWINGS

The foregoing aspects and other features of an apparatus or printer that detects volumetric drop variations in the inkjets during printing and compensates for these variations during the printing operation object are explained in the following description, taken in connection with the accompanying drawings.

DETAILED DESCRIPTION

Figure 1:
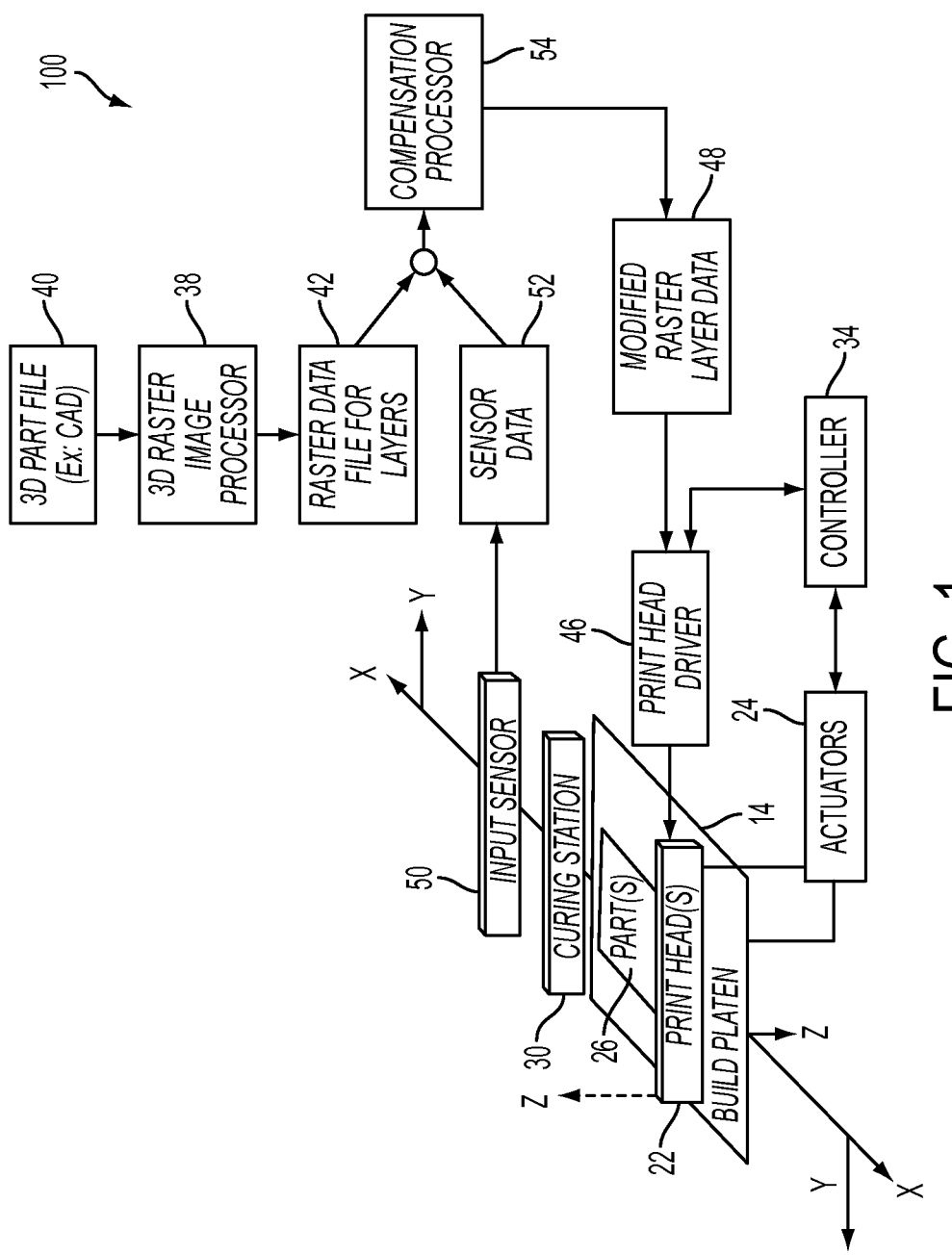
FIG. 1 is block diagram of a three-dimensional object printer that detects object printing errors and compensates for the errors during the object printing operation.

For a general understanding of the environment for the device disclosed herein as well as the details for the device, reference is made to the drawings. In the drawings, like reference numerals designate like elements.

Figure 6:
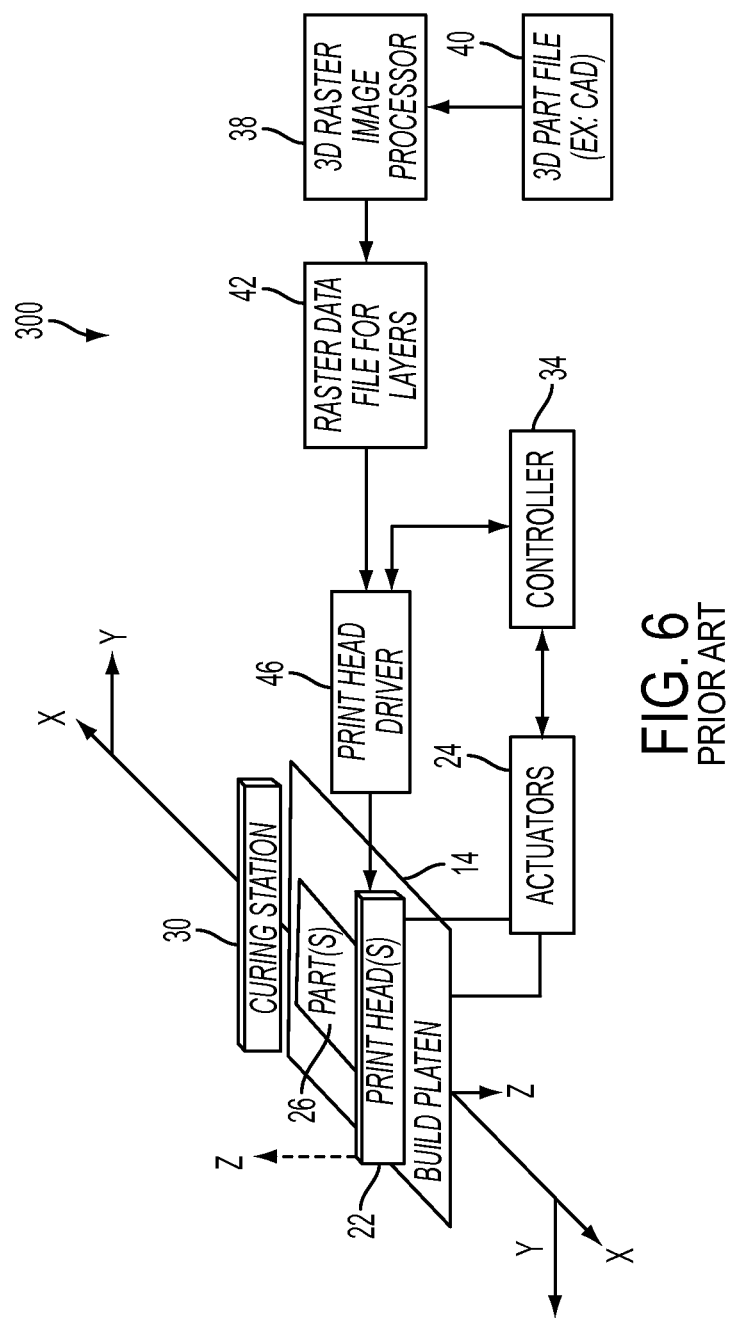
FIG. 6 is a block diagram of a prior art three-dimensional object printer.

FIG. 6 shows a configuration of components in a prior art printer 300, which produces a three-dimensional object or part 26. The printer 300 includes a support platen 14 on which one or more printheads 22 form an object or part 26. The printhead(s) are configured to eject building material and support material to form the part 26. These materials can require curing so the printer 300 includes a curing device 30. In some embodiments that eject photopolymer building material, the curing device 30 is an ultraviolet (UV) radiation source.

The printhead(s) 22 and support platen 14 are configured with actuators and the like for movement. As shown in the figure, the support platen 14 is configured for movement along an X axis and the printhead(s) is configured to move along a Z axis, although the platen 14 could also be configured for movement along the Z axis. The movements of the platen 14 and the printhead(s) 22 are coordinated by a controller 34, which is operatively connected to the actuators with which the platen and printhead(s) are configured for movement. In the figure, the printhead(s) 22 are wider along a Y axis than the part being built. Consequently, movement along the Y axis is not required. In some embodiments, the printhead(s) are not wider than the part so the platen 14 and/or printhead(s) 22 are configured for movement along the Y axis. As used herein, the term "process direction" refers to movement along one axis in the surface of the support platen 14 and "cross-process direction" refers to movement along an axis in the support platen 14 that is orthogonal to the process direction axis in that platen. Thus, the process and cross-process directions in FIG. 3 refer to the X axis and Y axis, respectively. While the platen 14 of FIG. 3 is shown as a planar member, other embodiments of three-dimensional printers include platens that are circular discs, an inner wall of a rotating cylinder or drum, or a rotating cone. The movement of the platen and the printhead(s) in these printers can be described with polar coordinates.

To operate the ejectors in the printhead(s), a three-dimensional raster processor 38 receives a file 40 of three-dimensional data of the part to be produced. These three-dimensional part data can be contained in a computer-aided design (CAD) file, for example. The processor 38 uses these data to generate a raster data file 42, which contains data that correspond to thin layers of the part. Typically, a layer has a thickness of a single drop of material. The printhead driver 46 receives the raster data file 42 and generates pixelated data that are used to operate the ejectors in the printhead(s) 22 for the ejection of building and support material onto the support platen 14 to form the part layer by layer. These pixelated data consists of voxels. A "voxel" as used in this document refers to data used to generate a firing signal for a single ejector in a printhead to eject one drop of material. The printhead driver 46 and the controller 34 generate signals to coordinate the movement of the platen 14 and the printhead(s) 22 with the operation of the ejectors in the printhead. As noted above, the movements of the platen and printhead(s) in a prior art printer, such as printer 300, are monitored with encoders and the like to enable the controller 34 to control the positioning of those components accurately.

As noted previously, one source of error in three-dimensional object printing arises from variations in the volumes of material drops from ejector to ejector. A printer has been developed that detects errors in the formation of the part caused by these volumetric variations while the part is being printed and compensates for these errors in subsequent layer printing for the part. One embodiment of such a printer is shown in FIG. 1. Using like reference numerals for like components, the printer 100 includes a platen 14, printhead(s) 22, curing device 30, a controller 34, a raster image processor 38 that generates a raster data file 42, and a printhead driver 46. Additionally, the printer 100 also includes an optical sensor 50 and a compensation processor 54. The optical processor is configured to generate topographical data of the part 26 along with measurements of features in the topographical data. Such a sensor can be a blue laser sensor available from Keyence Corporation of America, Itasca, Ill. in the LJ-V7000 series of two dimensional and three-dimensional laser measurement systems. This sensor can generate measurements of the material drops on the object as well as positional data regarding the location of the drops or features formed by the drops. These measurement data are provided as sensor data 52 to the compensation processor 54. The compensation processor 54 compares the measurement data with the data in the raster data file 42 for the layer previously printed and generates the differences between these data. The compensation processor 54 uses these differences to identify differences in height between columns of material drops formed by each ejector. These height differences are monitored and, from time to time, the compensation processor 54 modifies the raster data for the next layer to be printed. The printhead driver 46 receives these modified raster data to generate the pixelated data for operating the ejectors in the printhead and to control movement of the platen 14 and the printhead(s) 22. In this manner, the sensor 50 measures the height differences occurring in a previously printed layer and the compensation processor 54 adjusts raster data for forming a next layer to compensate for the measured height differences to keep the part within tolerances.

Figure 2:
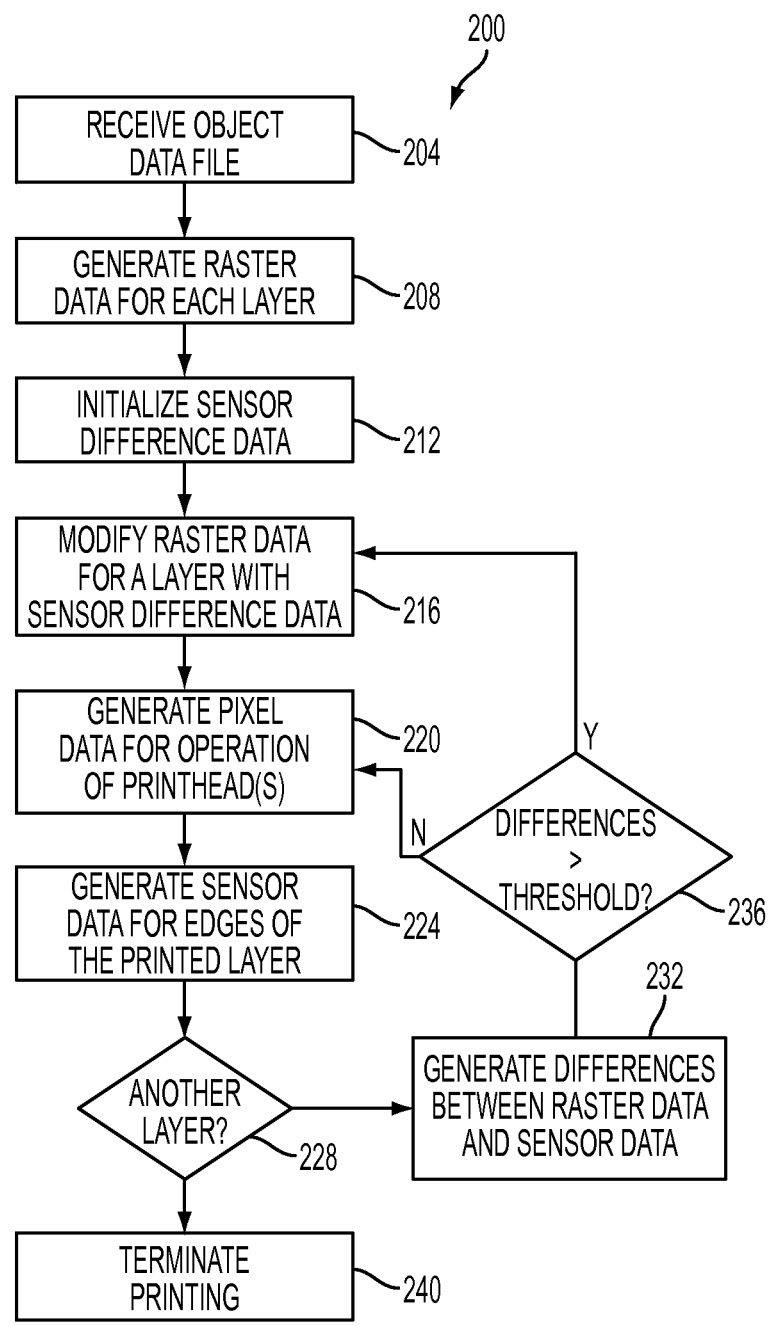
FIG. 2 is a flow diagram of a method that compensates for the height difference illustrated in FIG. 3.

A method 200 of operating a printer that compensates for measured errors in three-dimensional objects during their printing is shown in FIG. 2. In the description of this method, statements that a process is performing some task or function refers to a controller or general purpose processor executing programmed instructions stored in non-transitory computer readable storage media operatively connected to the controller or processor to manipulate data or to operate one or more components in the printer to perform the task or function. The controllers 34, 38, and 54 noted above can be such a controller or processor. Alternatively, these controllers can be implemented with more than one processor and associated circuitry and components, each of which is configured to form one or more tasks or functions described herein.

At the beginning of an object printing operation, the raster image processor receives a data file of three-dimensional data of a part (block 204). The raster image processor 54 generates raster image data for the layers to be printed to form the part (block 208). For the first layer no compensation is required so the measurements are initialized to an origin value (block 212). The compensation processor 54 passes the raster image data for the first layer through to the printhead driver 46 (block 216) and the driver generates the pixelated data for operating the ejectors in the printhead and controlling movement of the platen 14 and the printhead(s) 22 (block 220). The optical sensor generates topographical and measurement data as sensor data 52 (block 224). The compensation processor 54 determines if another layer is to be printed (block 228), and if another layer is to be printed, the processor compares the topographical and measurement data with the data in the raster data file 42 for the layer previously printed and identifies height differences between columns of material drops printed in the layer (block 232).

The compensation processor 54 compares these differences to a threshold (block 236). When the height differences between at least one column and the surrounding columns in the layer exceed the threshold, the compensation processor modifies the raster data for the next layer to be printed (block 216). The printhead driver 46 receives these modified raster data to generate the pixelated data for operating the ejectors in the printhead and controlling movement of the platen 14 and the printhead(s) 22 (block 220). This compensation scheme continues until no more layers are to be printed (block 228) and the process terminates (block 240). If the height differences do not exceed the threshold (block 236), then the printhead driver 46 uses the unmodified raster data for the next layer to operate the printheads (block 220).

Figure 3A:
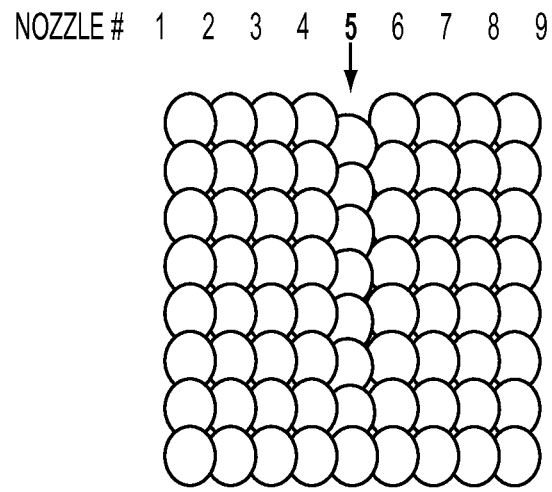
FIG. 3A and FIG. 3B illustrate a difference in column height caused by one ejector ejecting material drops that are smaller than the ejectors forming columns adjacent to the one being formed with the smaller drops.
Figure 3B:
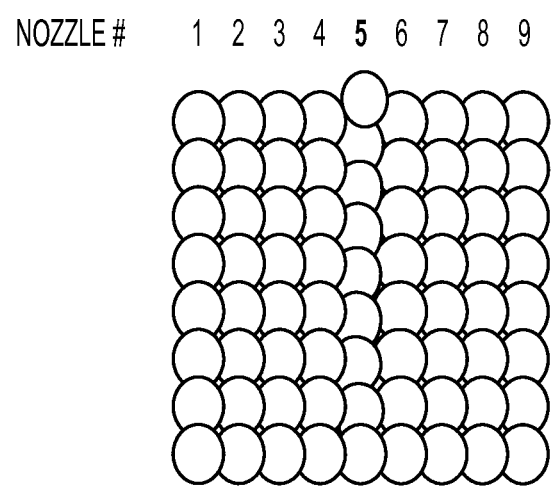

By way of example, the modification of the raster data is shown in FIGS. 3A and 3B. In FIG. 3A, the smaller drops ejected by the ejector forming column 5 has resulted in that column being shorter than the other columns in the area. The compensation processor uses the data from the sensor 50 to monitor this height difference until the difference is approximately one-half the height of a single ink drop. To compensate, the compensation processor 54 modifies the raster data by generating a layer in the raster data that corresponds to a single voxel for the ejector forming column 5. When the printhead driver 46 processes this layer, the ejector forming column 5 is operated to eject a single drop and the fifth column extends above the other columns as shown in FIG. 3B. Thereafter, the printer continues to operate the printhead with reference to the raster data for the subsequent layers and the smaller drops ejected by the ejector forming column 5 enable the surrounding columns to decrease the difference between the height of column 5 and the surrounding columns until the columns are approximately the same height. If ejectors form more layers, column 5 may once again fall short of the surrounding columns and the compensation is repeated. In a similar manner, if the ejector forming column 5 was ejecting drops with a volume that is greater than the surrounding ejectors, the compensation processor 54 could remove raster data for the ejector to enable the other ejectors to eject drops in a layer, while the ejector forming column 5 does not. This operation causes column 5 to be shorter than the surrounding columns, but continued operation of the ejectors, including the ejector forming column 5 eventually results in the columns being approximately the same height. Of course, if column 5 rises to a height greater than one-half a single drop about the surrounding columns, the removal of raster data for the ejector forming column 5 for a single layer can be removed to compensate for the height difference.

The example explained with reference to FIG. 3A and FIG. 3B can be further refined in printers having printheads with ejectors that can be adjusted to eject material drops of different volumes. For example, some printhead drivers generate firing signals having different magnitudes, frequencies, or waveforms to operate ejectors for ejecting different drop sizes. In these printers, the height differences are compared to a threshold that is one half the smallest drop size that can be ejected by an ejector. The raster data are then modified to add or remove raster data corresponding to ejection of a single drop of the smallest volume. Consequently, the compensation scheme occurs more frequently, but the adjustment does not result in as large a difference between columns following a compensation operation.

Figure 4:
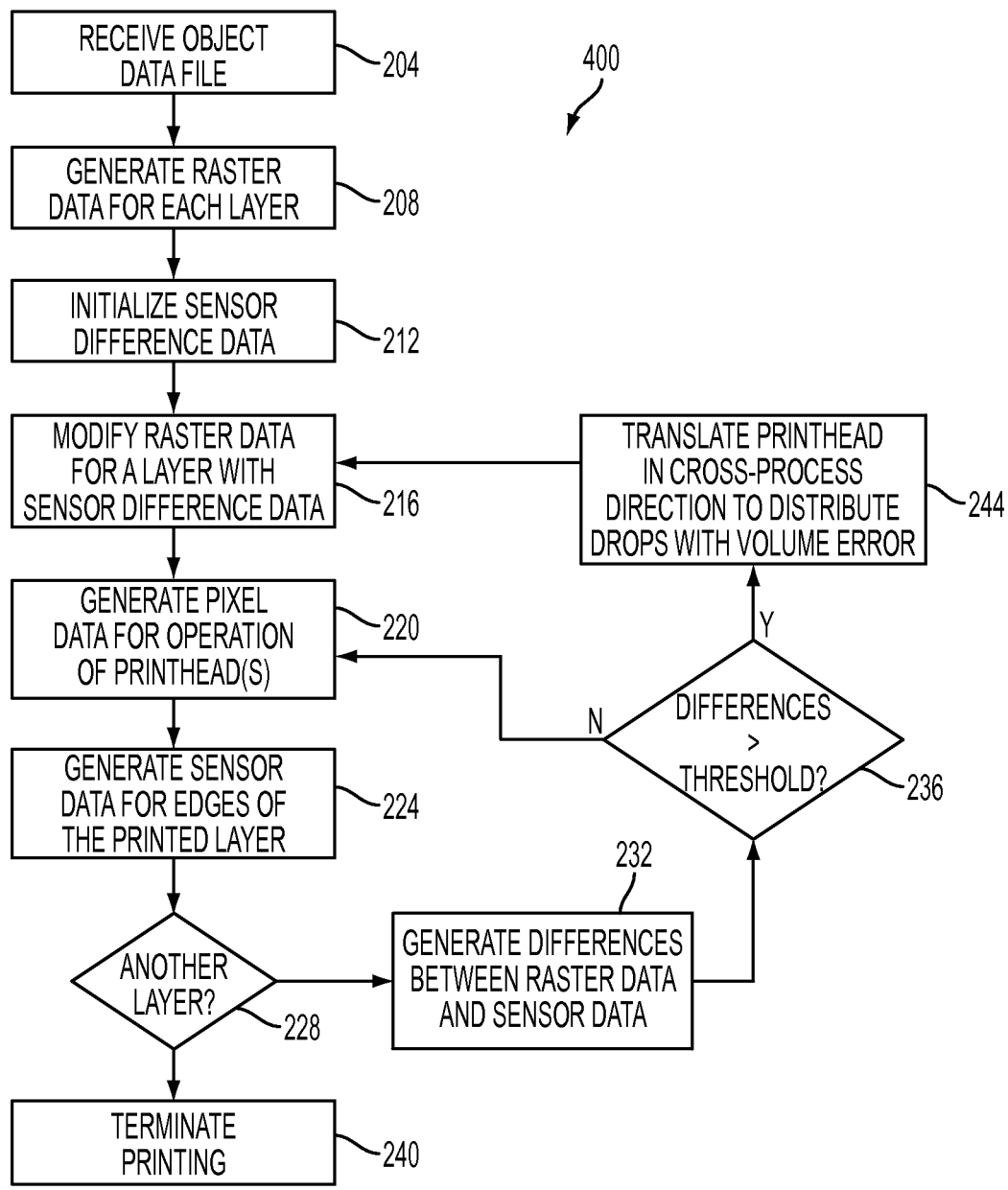
FIG. 4 is a flow diagram of a method that distributes the smaller volume material drops through various layers in an object to attenuate the height difference caused by the smaller drops.
Figure 5:
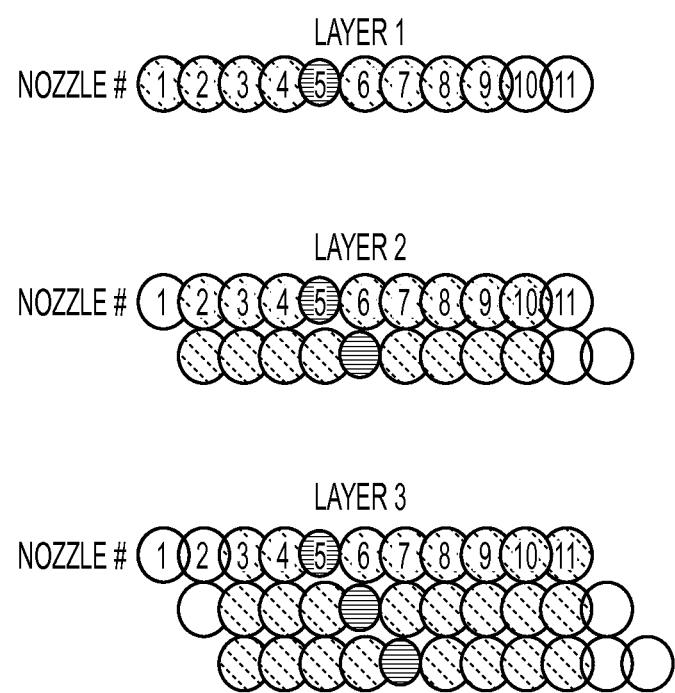
FIG. 5 is an illustration of the distribution of the smaller volume drops.

As noted above, differences in height between columns of material occur because each ejector forms a single column. One way of addressing the volume variations in the ejectors is to distribute the variation across the columns in the cross-process or Y direction. This distribution is achieved by moving the printhead in the cross-process direction by a distance corresponding to one or more integral widths of a single column. The raster image data are also shifted by a number of positions to ensure each ejector ejects the drop corresponding to its new position. Consequently, the process of FIG. 2 is modified to produce the process 400 of FIG. 4. Process 400 is the same as process 200 except, upon detection of a height difference exceeding the threshold (block 236), the compensation processor 54 operates actuators to translate the printhead in the cross-process direction (block 244). The processor then modifies the raster image data to correspond to this translation (block 216). Otherwise, the printhead is not moved and the raster data for the next layer is not modified (block 220). The smaller volume drops ejected by the ejector that forms column 5 in the first layer are then distributed to other positions in other layers as illustrated in FIG. 5.

The methods disclosed herein may be implemented by a processor being configured with instructions and related circuitry to perform the methods. Additionally, processor instructions can be stored on a non-transitory computer readable storage media so they can accessed and executed by a controller or other processor to operate a printer and compensate for drop volume variations during printing of a three-dimensional object. The programmed instructions stored on the non-transitory computer readable storage media are configured to enable a controller or other processor executing the programmed instructions to: (1) generate raster image data for layers to be printed that form an object on a platen, (2) operate a printhead with reference to the generated raster image data to eject material onto the platen to the object, and (3) compensate for variations in drop volumes between the at least one ejector and other ejectors in the printhead ejecting material to form the object by modifying the generated raster image data for at least one ejector in the printhead with reference to data received from an optical sensor.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A printer comprising:
   a platen;
   a printhead configured with ejectors to eject material onto the platen;
   an optical sensor configured to generate data corresponding to a topography and measurement of the material on the platen; and
   a controller operatively connected to the optical sensor and the printhead, the controller being configured to generate raster image data for layers to be printed that form an object on the platen, to operate the printhead to eject material onto the platen with reference to the raster image data for the layers, and to modify raster image data for at least one ejector with reference to topographical and measurement data received from the optical sensor to compensate for variations in drop volumes between the at least one ejector and other ejectors in the printhead ejecting material.

2. The printer of claim 1 wherein the optical sensor is a blue laser sensor.

3. The printer of claim 1 wherein the platen is a planar member.

4. The printer of claim 1, the controller being further configured to:
   identify a difference in height between a column of material being formed by the at least one ejector and columns of material being formed by the other ejectors in the printhead with reference to the topographical and measurement data received from the optical sensor; and
   modify the raster image data for the at least one ejector with reference to the identified difference.

5. The printer of claim 1, the controller being further configured to:
   add an additional voxel to the raster image data for the at least one ejector in response to the identified difference indicating the column of material formed by the at least one ejector is shorter than the columns of material formed by the other ejectors; and
   operate the at least one ejector to eject a drop of material onto the column of material being formed by the at least one ejector with reference to the additional voxel while not operating the other ejectors to reduce the difference between the column of material being formed by the at least one ejector and the columns of material being formed by the other ejectors.

6. The printer of claim 1, the controller being further configured to:
   remove a voxel from the raster image data for the at least one ejector in response to the identified difference indicating the column of material formed by the at least one ejector is taller than the columns of material formed by the other ejectors; and
   operate the other ejectors to eject a drop of material onto each column of material being formed by the other ejectors while not operating the at least one ejector to reduce the difference between the column of material being formed by the at least one ejector and the columns of material being formed by the other ejectors.

7. The printer of claim 5, the controller being further configured to reduce a size of the material drop to be ejected by the at least one ejector with reference to the added voxel, the reduced size of the material drop being less than a size of the material drops ejected by the other ejectors.

8. The printer of claim 4, the controller being further configured to reduce a size of the material drop to be ejected by the at least one ejector while operating the other ejectors to eject material drops with a size larger than the reduced size of the material drop ejected by the at least one ejector.

9. A printer comprising:
   a platen;
   a printhead configured with ejectors to eject material onto the platen;
   an optical sensor configured to generate data corresponding to a topography and measurement of the material on the platen; and
   a controller operatively connected to the optical sensor and the printhead, the controller being configured to operate the ejectors in the printhead to eject material drops onto the platen, to identify differences between volumes of material drops ejecting by the ejectors with reference to topographical and measurement data received from the optical sensor, and to move the printhead to form each column of material on the platen with material ejected from more than one ejector in the printhead to compensate for the identified differences in drop volumes.

10. The printer of claim 9, the controller being further configured to move the printhead in a cross-process direction.

11. The printer of claim 9 wherein the optical sensor is a blue laser sensor.

12. The printer of claim 9 wherein the platen is a planar member.

13. The printer of claim 9, the controller being further configured to:
    generate raster image data for layers to be printed to form an object on the platen;
    operate the printhead to eject material onto the platen with reference to the raster image data for the layers; and
    modify raster image data for at least one ejector with reference to topographical and measurement data received from the optical sensor to compensate for the identified differences in drop volumes.

14. The printer of claim 13, the controller being further configured to:
    add an additional voxel to the raster image data for the at least one ejector in response to the identified differences in drop volumes indicating a column of material formed by the at least one ejector is shorter than columns of material formed by other ejectors in the printhead; and
    operate the at least one ejector to eject a drop of material onto the column of material being formed by the at least one ejector with reference to the additional voxel while not operating the other ejectors to reduce the difference between the column of material being formed by the at least one ejector and the columns of material being formed by the other ejectors.

15. The printer of claim 13, the controller being further configured to:
    remove a voxel from the raster image data for the at least one ejector in response to the identified differences in drop volumes indicating a column of material formed by the at least one ejector is taller than columns of material formed by other ejectors in the printhead; and
    operate the other ejectors to eject a drop of material onto each column of material being formed by the other ejectors while not operating the at least one ejector to reduce the difference between the column of material being formed by the at least one ejector and the columns of material being formed by the other ejectors.

16. The printer of claim 14, the controller being further configured to reduce a size of the material drop to be ejected by the at least one ejector with reference to the added voxel, the reduced size of the material drop being less than a size of the material drops ejected by the other ejectors.

17. The printer of claim 13, the controller being further configured to reduce a size of the material drop to be ejected by at least one ejector while operating other ejectors in the printhead to eject material drops with a size larger than the reduced size of the material drop ejected by the at least one ejector.

18. A non-transitory computer readable storage media on which programmed instructions for operating a printer having been stored, the programmed instructions being configured to enable a controller executing the programmed instructions to:
    generate raster image data for layers to be printed that form an object on a platen;
    operate a printhead with reference to the generated raster image data to eject material onto the platen to the object; and compensate for variations in drop volumes between the at least one ejector and other ejectors in the printhead ejecting material to form the object by modifying the generated raster image data for at least one ejector in the printhead with reference to data received from an optical sensor.

* * * * *